United States Patent
Mann et al.

(10) Patent No.: US 7,936,755 B2
(45) Date of Patent: *May 3, 2011

(54) INGRESS PROCESSING OPTIMIZATION VIA TRAFFIC CLASSIFICATION AND GROUPING

(75) Inventors: Erik K. Mann, Hillsboro, OR (US); Patrick L. Connor, Portland, OR (US); Diamant Nimrod, Kiar Saba (IL)

(73) Assignee: Intel Corporation, Santa Clara, CA (US)

( * ) Notice: Subject to any disclaimer, the term of this patent is extended or adjusted under 35 U.S.C. 154(b) by 1726 days.

This patent is subject to a terminal disclaimer.

(21) Appl. No.: 11/141,917

(22) Filed: Jun. 1, 2005

(65) Prior Publication Data

US 2005/0220111 A1  Oct. 6, 2005

Related U.S. Application Data

(62) Division of application No. 10/044,989, filed on Jan. 15, 2002, now Pat. No. 6,957,281.

(51) Int. Cl.
*H04L 12/28* (2006.01)
(52) U.S. Cl. .............................. 370/392; 370/473; 710/5
(58) Field of Classification Search .................. 370/229, 370/235, 236, 464, 465, 469, 471, 472, 473, 370/474, 476, 498, 522, 449, 389, 392; 709/204, 709/207, 217, 219, 227, 228, 230, 236, 216; 726/4, 27; 710/5
See application file for complete search history.

(56) References Cited

U.S. PATENT DOCUMENTS

| | | | |
|---|---|---|---|
| 3,749,845 A * | 7/1973 | Fraser | 370/433 |
| 6,021,263 A | 2/2000 | Kujoory et al. | 709/232 |
| 6,453,360 B1 * | 9/2002 | Muller et al. | 709/250 |
| 6,618,793 B2 | 9/2003 | Rozario et al. | 711/133 |
| 6,633,576 B1 | 10/2003 | Melaragni et al. | 370/412 |
| 6,633,835 B1 | 10/2003 | Moran et al. | 702/190 |
| 6,665,495 B1 | 12/2003 | Miles et al. | 398/54 |
| 6,665,755 B2 | 12/2003 | Modelski et al. | 710/100 |
| 6,708,292 B1 | 3/2004 | Mangasarian | 714/39 |
| 6,718,326 B2 | 4/2004 | Uga et al. | 707/6 |
| 6,816,455 B2 | 11/2004 | Goldberg et al. | 370/230 |
| 6,934,296 B2 * | 8/2005 | Shimojo | 370/428 |
| 7,586,925 B2 * | 9/2009 | Smith et al. | 370/399 |
| 2002/0126711 A1 * | 9/2002 | Robinett et al. | 370/535 |
| 2002/0181506 A1 * | 12/2002 | Loguinov | 370/473 |
| 2009/0154459 A1 * | 6/2009 | Husak et al. | 370/390 |

* cited by examiner

*Primary Examiner* — Seema S Rao
*Assistant Examiner* — Sai-Ming Chan
(74) *Attorney, Agent, or Firm* — Pillsbury Winthrop Shaw Pittman LLP

(57) ABSTRACT

An arrangement is provided for ingress processing optimization via traffic classification and grouping. A plurality of packets are classified according to a classification criterion. The classified packets are used to generate a packet bundle containing packets that are uniform with respect to the classification criterion. The packet bundle and its corresponding packet bundle descriptor are transferred to a host which then processes the packet bundle as a whole according to the information contained in the packet bundle descriptor.

12 Claims, 8 Drawing Sheets

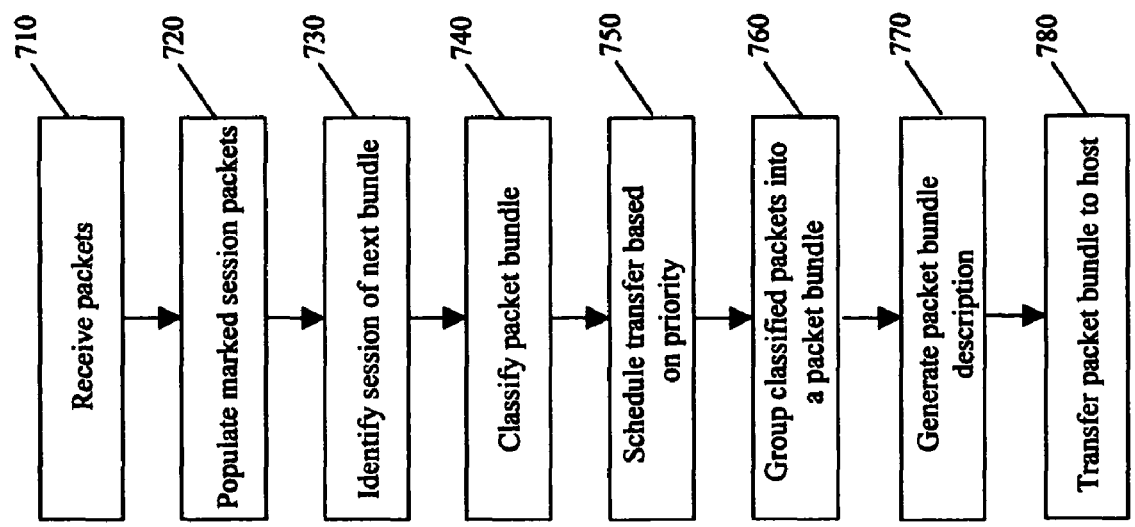

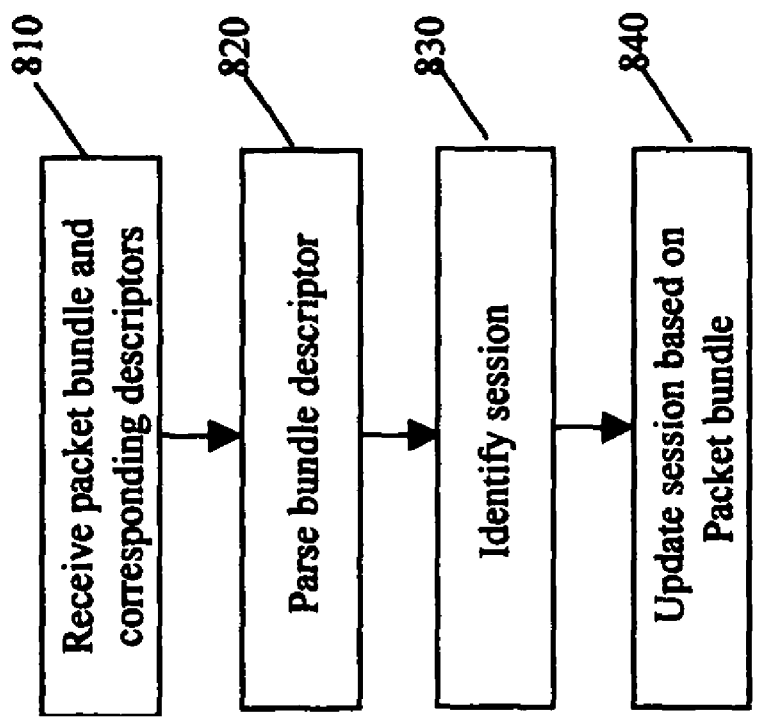

INGRESS PROCESSING OPTIMIZATION VIA TRAFFIC CLASSIFICATION AND GROUPING

This application is a divisional application of utility application Ser. No. 10/044,989, filed Jan. 15, 2002, now U.S. Pat. No. 6,957,281.

RESERVATION OF COPYRIGHT

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

BACKGROUND

Aspects of the present invention relate to communications. Other aspects of the present invention relate to packet based communication.

Data exchange between independent network nodes is frequently accomplished via establishing a "session" to synchronize data transfer between the independent network nodes. For example, transmission control protocol/Internet protocol (TCP/IP) is a popular implementation of such a session method. Data transferred over such an established session is usually fragmented or segmented, prior to transmission on a communication media, into smaller encapsulated and formatted units. In the context of input and output controllers such as Ethernet Media Access Controllers (MACs), these encapsulated data units are called packets. Since packets are originally derived from data of some communication session, they are usually marked as "belonging" to a particular session and such marking is usually included in (or encapsulated in) the packets. For instance, in a TCP/IP session, network addresses and ports embedded in the packets are used to implement per-packet session identification.

When packets of the same session are received at a destination, they may be temporarily stored in a buffer on an I/O controller prior to being further transferred to a host system where the packets will be re-assembled or defragmented to re-create the original data. The host system at a destination may be a server that may provide network services to hundreds or even thousands of remote network nodes.

When a plurality of network nodes simultaneously access a common network resource, packets from a communication session may be shuffled with packets from hundreds of other different sessions. Due to this unpredictable data shuffling, a host system generally processes each received packet individually, including identifying a session from the received packet and accordingly identifying a corresponding session on the host system to which the received packet belongs. There is an overhead on the host system associated with such processing. In addition, when a data stream is transmitted continuously under a communication session, each received packet, upon arriving at the host, may need to be incorporated into the existing data stream that constitutes the same session. Using newly arrived packets to update an existing session is part of the re-assembly or defragmentation. This further increases the overhead on the host system. Furthermore, the overhead may increase drastically when there are a plurality of concurrent communication sessions. High overhead degrades a host system's performance.

When notified of the arrival of a packet, a host system processes the packet, determines the packet's underlying session, and updates an existing session to which the arrived packet belongs. Processing one packet at a time enables the host system to better handle a situation in which packets from different sessions are shuffled and arrive in a random manner. It does not, however, take advantage of the fact that packets are often sent in bursts (or so called packet troops or packet trains).

There have been efforts to utilize such burst transmission properties to improve performance. For example, packet classification techniques have been applied in routing technology that exploits the behavior of packet train to accelerate packet routing. Packet classification techniques have also been applied for other purposes such as quality of service, traffic metering, traffic shaping, and congestion management. Such applications may improve the packet transmission speed across networks. Unfortunately, they do not impact a host system's (at the destination of the transmitted packets) capability in re-assembling the received packets coming from a plurality of underlying communication sessions.

A gigabit Ethernet technology known as 'jumbo frames' attempted to improve the performance at a destination. It utilizes "jumbo frames" that increases the maximum packet size from 1518 bytes (the Ethernet standard size) to 9022 bytes. The goal is to reduce the data units transmitted over the communications media and subsequently a network node may consume fewer CPU resources (overhead) for the same amount of data-per-second processed when "jumbo frames" are used. However, data units that are merged to form a larger unit are not classified. As a consequence, at destination, a host system may still need to classify packets before they can be used to re-assemble the data of specific sessions. Due to that, the overhead used to correctly recover the original data streams may still remain high.

BRIEF DESCRIPTION OF THE DRAWINGS

The present invention is further described in terms of exemplary embodiments, which will be described in detail with reference to the drawings. These embodiments are non-limiting exemplary embodiments, in which like reference numerals represent similar parts throughout the several views of the drawings, and wherein:

FIG. 7 is an exemplary flowchart of an I/O controller, according to an embodiment of the present invention; and FIG. 8 is an exemplary flowchart of a host, according to an embodiment of the present invention.

DETAILED DESCRIPTION

The processing described below may be performed by a properly programmed general-purpose computer alone or in connection with a special purpose computer. Such processing may be performed by a single platform or by a distributed processing platform. In addition, such processing and functionality can be implemented in the form of special purpose hardware or in the form of software being run by a general-purpose computer. Any data handled in such processing or created as a result of such processing can be stored in any memory as is conventional in the art. By way of example, such data may be stored in a temporary memory, such as in the RAM of a given computer system or subsystem. In addition, or in the alternative, such data may be stored in longer-term storage devices, for example, magnetic disks, rewritable optical disks, and so on. For purposes of the disclosure herein, a computer-readable media may comprise any form of data storage mechanism, including such existing memory technologies as well as hardware or circuit representations of such structures and of such data.

Figure 1:
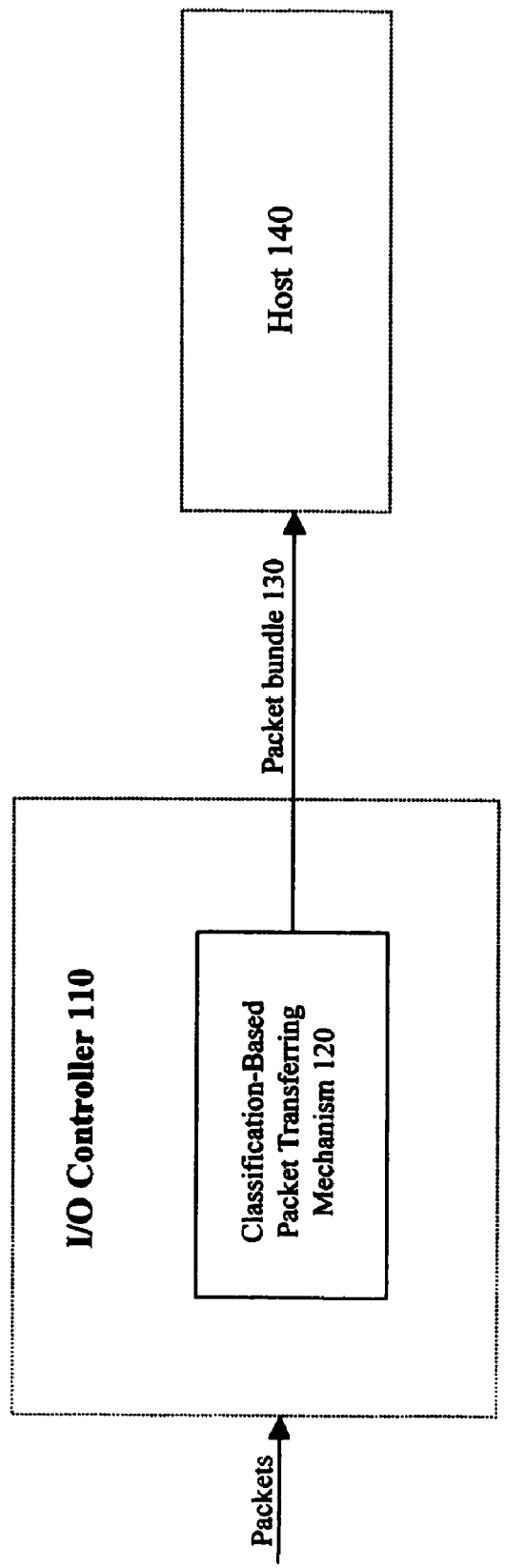
FIG. 1 depicts a high level architecture which supports classification based packet bundle generation and transfer between an I/O controller and a host, according to embodiments of the present invention.

FIG. 1 depicts a high level architecture 100 that supports classification based packet bundle generation and transfer between an I/O controller 110 and a host 140, according to embodiments of the present invention. Upon receiving packets, the I/O controller 110 activates a classification based packet transferring mechanism 120 to classify received packets according to some classification criterion, group classified packets into packet bundles, and then transfer the packet bundles to the host 140 at appropriate times. Upon receiving a packet bundle, the host 140 processes the packet bundle as a whole.

A packet bundle 130 is transferred from the I/O controller 110 to the host 140 via a generic connection. The I/O controller 110 and the host 140 may or may not reside at a same physical location. The connection between the I/O controller 110 and the host 140 may be realized as a wired connection such as a conventional bus in a computer system or a peripheral component interconnect (PCI) or as a wireless connection.

The classification-based packet transferring mechanism 120 organizes packets into packet bundles, each of which may comprise one or more packets that are uniform with respect to some classification criterion. For example, the classification-based packet transferring mechanism 120 may classify received packets according to their session numbers. In this case, packets in a single packet bundle all have the same session number.

An optional "classification ID" may be assigned to this packet bundle and provided to the host. The classification-based packet transferring mechanism 120 may classify received packets into one of a fixed number of sessions. If the number of sessions being received exceeds the number of sessions that the classification-based packet transferring mechanism 120 can indicate, one or more sessions may be marked with the same session identification.

When the packet bundle 130 is transferred to the host 140, a packet bundle descriptor may also be transferred with the packet bundle 130 that specifies the organization of the underlying packet bundle. Such a packet bundle descriptor may provide information such as the number of packets in the bundle and optionally the session number of the bundle. The descriptor may also include information about individual packets. For example, a packet bundle descriptor may specify the length of each packet The information contained in a packet bundle descriptor may be determined based on application needs.

When a packet bundle is constructed from classified packets, the classification-based packet transferring mechanism 120 determines an appropriate timing to transfer the packet bundle. When there are a plurality of packet bundles ready to be transferred, the classification-based packet transferring mechanism 120 may also determine the order in which packet bundles are transferred according to some pre-specified conditions. For example, the classification based packet transferring mechanism 120 may determine the order of transferring based on the priority tagging of the underlying packets. It may schedule a packet bundle whose packets have a higher priority to be transferred prior to another packet bundle whose packets have a lower priority. The classification based packet transferring mechanism 120 may also transfer the packet bundles into multiple, separate, and predefined receive queues based on the classification and/or priority of the packet bundles.

Figure 2:
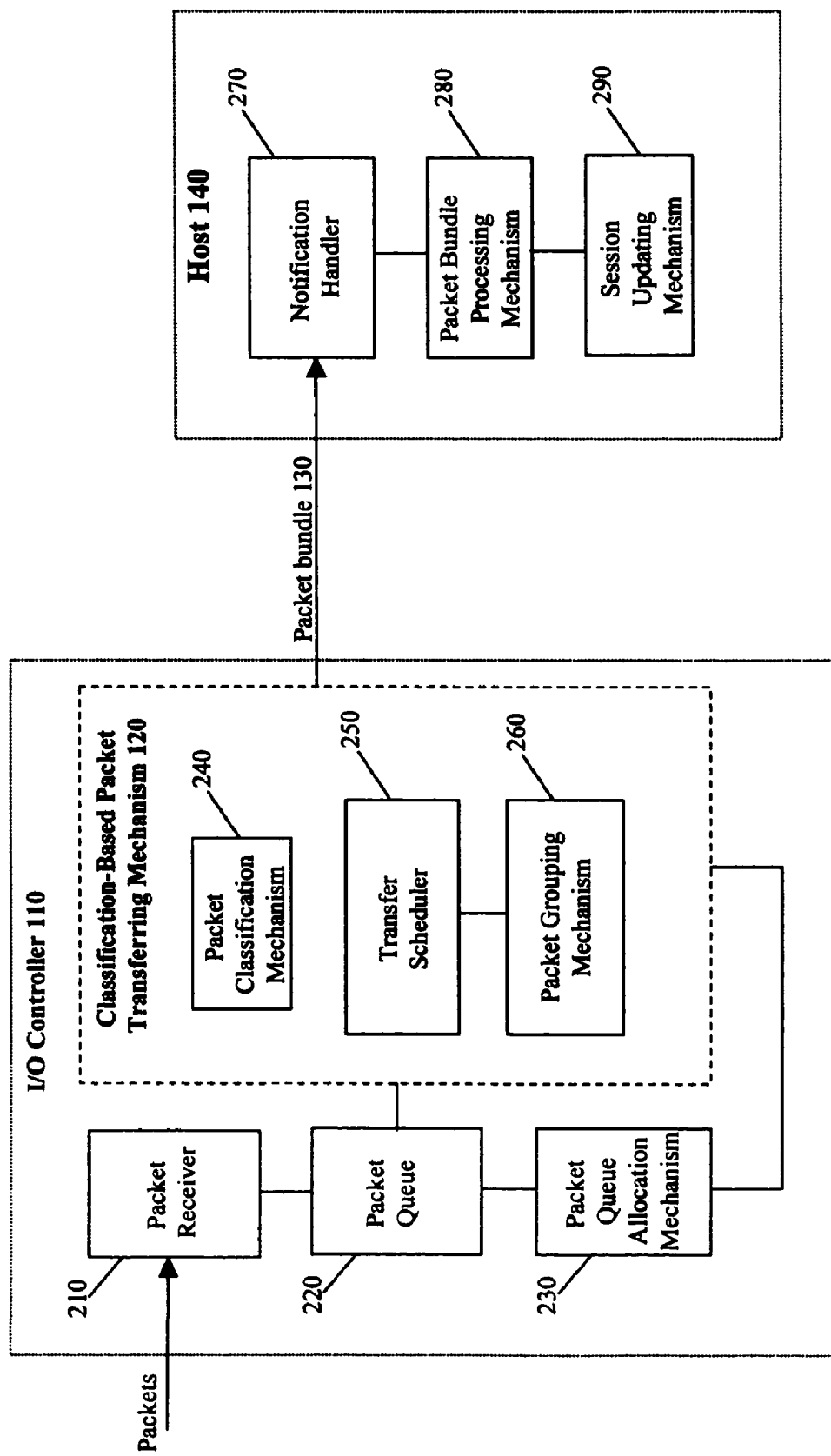
FIG. 2 depicts the internal structure of an I/O controller, in relation to a host, that is capable of grouping packets into a bundle based on classification, according to embodiments of the present invention.

FIG. 2 depicts the internal structure of the I/O controller 110 in relation to the host 140, according to embodiments of the present invention. The I/O controller 110 comprises a packet receiver 210, a packet queue 220, a packet queue allocation mechanism 230, and the classification-based packet transferring mechanism 120 which includes a packet classification mechanism 240, a transfer scheduler 250, and a packet grouping mechanism 260. The packet queue allocation mechanism 230 may allocate one or more packet queues as storage space for received packets. Upon intercepting incoming packets, the packet receiver 210 buffers the received packets in the packet queue 220.

The packet queue 220 may be implemented as a first in and first out (FIFO) mechanism. With this implementation, packets in the FIFO may be accessed from one end of the queue (e.g., front end) and the incoming packets are buffered from the other end of the queue (e.g., rear end). In this way, the packet that is immediately accessible may be defined as the one that has been in the queue the longest. When the packet receiver 210 intercepts incoming packets, it populates the received packets in the packet queue 220 by inserting the packets to the rear end of the packet queue 220. The packet queue 220 may also be realized as a collection of FIFOs.

The packet queue 220 may be realized either within the I/O controller 110 (as shown in FIG. 2) or within the memory of the host 140 (not shown). The packet queue 220 provides a space for packet look ahead (will be discussed later) and for manipulating the received packets, including re-ordering the packets according to some classification criterion. The size of the packet buffer 220 may be determined based on application needs and such system configuration factors as, for example, speed requirements.

The classification-based packet transferring mechanism 120 may access the received packets from the front end of the packet queue 220. To classify received packets according to, for example, session numbers, the classification-based packet transferring mechanism 120 may dynamically determine a session number for classification purposes from a buffered packet that is immediately accessible in the front of the packet queue 220. Such a session number may be extracted from the buffered packet.

With a classification criterion (e.g., a session number), the packet classification mechanism 240 may look ahead of the received packets buffered in the packet queue 220 and classifying them according to the session number. The size of the packet queue 220 may constrain the scope of the classification operation (i.e., how far to look ahead in the packet stream) and may be determined based on particular application needs or other system configuration factors. For instance, assume an I/O controller is operating at a speed of one gigabits-per-second, then one (1) 1500 byte packet can be received every 12 usec. Further assume that an inter-packet-gap is around 24 usec between packets of the same network session. Under such operational environment, the size of the packet queue 220 may be required to be big enough to store and classify at least four (4) 1500 byte packets (a total of 6000 bytes) simultaneously to support the speed requirement.

As mentioned earlier, the packet queue 220 may be realized differently. For example, it may be implemented as an on-chip FIFO within the I/O controller 110. In this case, the above described example will need a packet buffer (or FIFO) of at least 6000 bytes. Today's high-speed Ethernet controllers can adequately support 32K or larger on-chip FIFOs.

When the packet queue 220 is implemented within the I/O controller 110, the packet classification mechanism 240 in the classification-based packet transferring mechanism 120 looks ahead and classifies the packets within the FIFO on the I/O controller. According to the classification outcome, the order of the received packets may be re-arranged in the packet queue 220 (e.g., arrange all the packets with a same session number in a sequence). To deliver such processed packets to the host 140, the packets are retrieved from the queue and then sent to the host 140.

If the packet queue 220 is realized on the host 140, the packet classification mechanism 240 may perform classification within the memory of the host 140. In this case, when the classification is done, to deliver the processed packets to the host 140 for further processing, the processed packets may not need to be moved and the host 140 may be simply notified of the processed packets in the memory.

When classification is complete, all packets that are classified as a single group have, for example, the same session number and are arranged according to, for instance, the order they are received. This group of packets may be delivered to the host 140 as one unit identified by the session number. The transfer scheduler 250 may determine both the timing of the deliver and form (sending the packets from the I/O controller 110 to the host 140 or sending simply a notification to the host 140) of the delivery. The transfer scheduler 250 may decide the delivery timing according to the priority associated with the packets, wherein such priority may be tagged in the packets. A packet group with a higher priority may be delivered before another packet group that has a lower priority.

When there are multiple FIFOs, the transfer scheduler 250 may also schedule the transfer of classified packets from different FIFOs also through priority scheduling. In addition, an on-going transfer of a group of packets that has lower priority packets may be pre-empted so that another group of packets that has higher priority packets can be transferred to the host 140 in a timely fashion. The transfer of the pre-empted group may be restored after the transfer of the higher priority group is completed.

The packet receiver 210 and the mechanisms such as the packet classification mechanism 240 and the packet grouping mechanism 260 may share the resource of the packet queue 220. The process of populating the buffered packets and the process of processing these packets (e.g., classifying and grouping) may be performed asynchronously. For example, the packet receiver 210 may push received packets into a FIFO and the packet classification mechanism 240 may pop packets from the same FIFO.

When a transfer schedule is determined, the transfer scheduler 250 notifies the packet grouping mechanism 260, which subsequently generates a packet bundle 130 with a corresponding packet bundle descriptor. The packet bundle 130 is a collection of packets that are uniform in the sense that they all have the same characteristic with respect to some classification criterion (e.g., all have the same session number, or hash result of session number or other fields). The packets in a packet bundle may be arranged in the order they are received. The corresponding packet bundle descriptor is to provide information about the underlying packet bundle. Such information facilitates the host 140 to process the underlying packet bundle.

Figure 3:
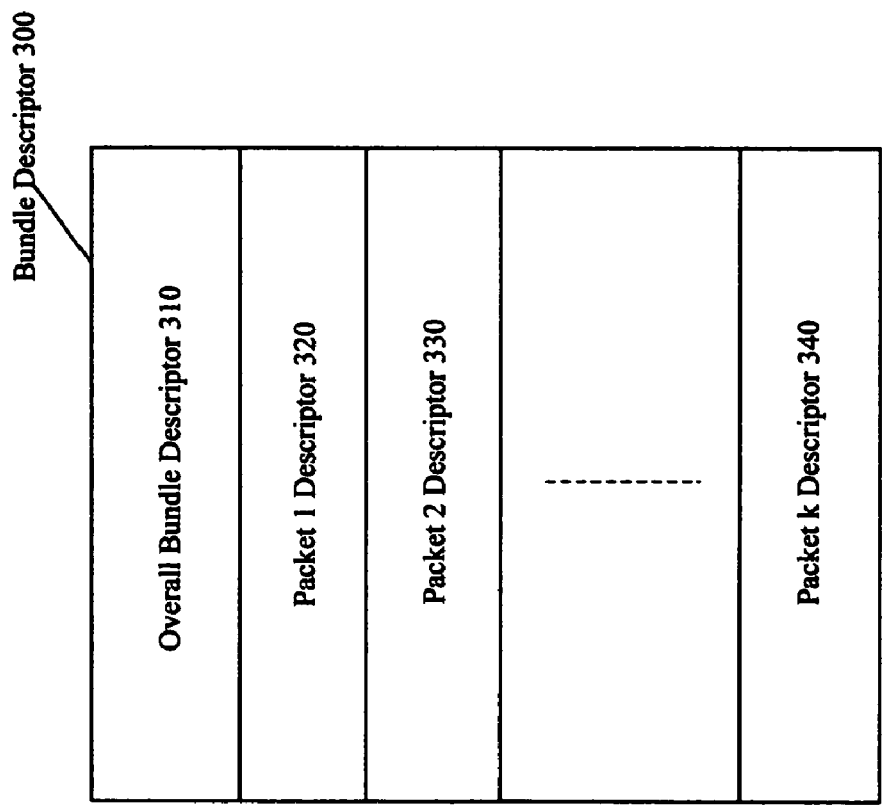
FIG. 3 shows an exemplary construct of a packet bundle descriptor, according to an embodiment of the present invention.

FIG. 3 shows an exemplary construct 300 of a packet bundle descriptor, according to an embodiment of the present invention. A packet bundle descriptor may comprise an overall bundle descriptor 310 and a collection of packet descriptors 320, 330, . . . , 340. The bundle descriptor 310 may include information about the organization of the underlying packet bundle such as the number of packets. A packet descriptor may provide information related to each individual packet such as the packet length.

Figure 4:
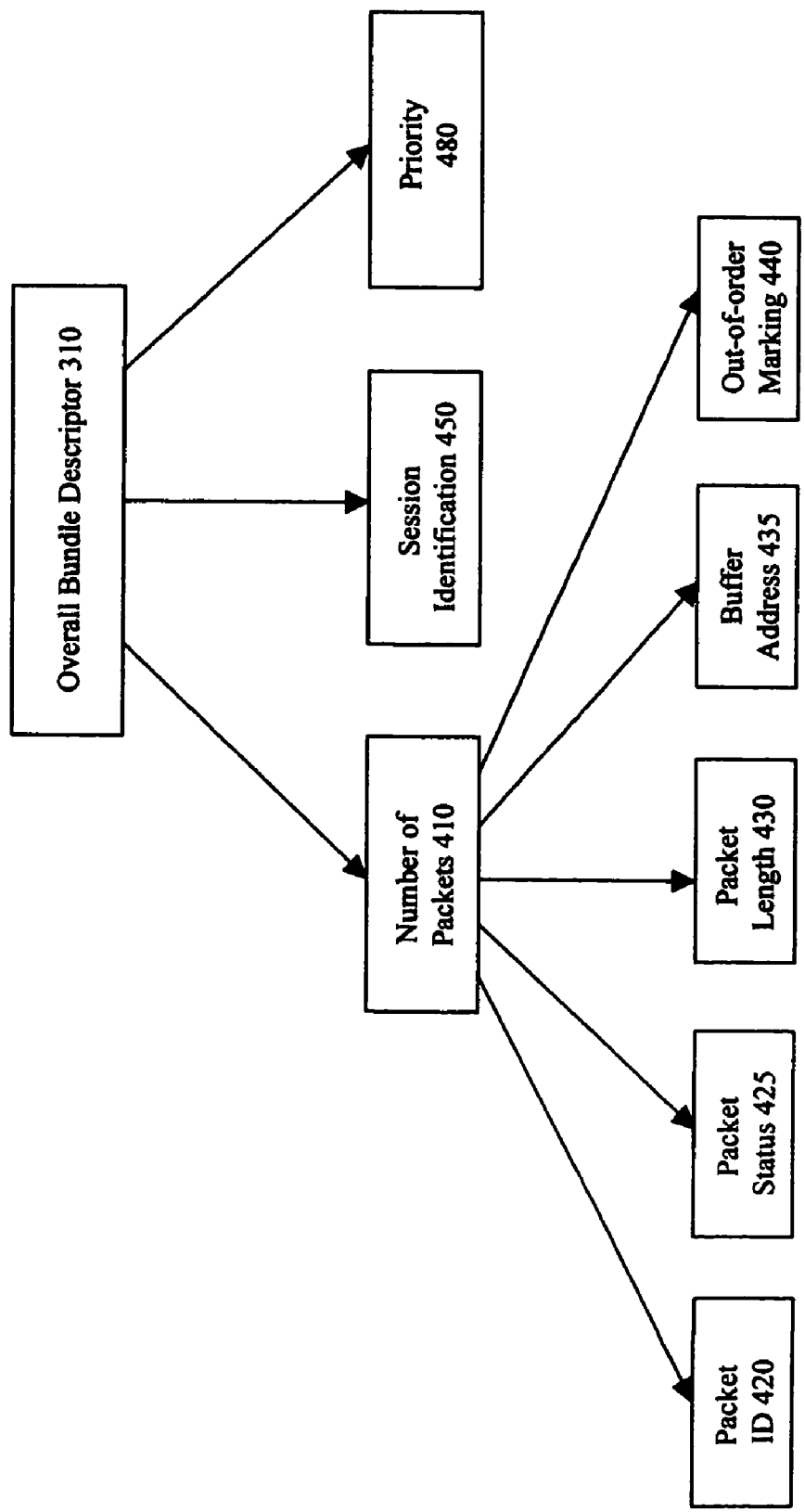
FIG. 4 shows an exemplary content of a packet bundle descriptor, according to an embodiment of the present invention.

FIG. 4 shows exemplary content of the overall bundle descriptor 310, according to an embodiment of the present invention. The overall bundle descriptor 310 may specify the number of packets 410 contained in the underlying packet bundle and some identifying characteristics associated with the packet bundle such as a session identification 450 and a priority level 480. The host 140 may use such information during processing. For example, the host 140 may update an existing session using a received packet bundle according to the session number provided in the corresponding packet bundle descriptor. Based on the number of packets 410, the host 140 may, for instance, update the corresponding existing session with a correct number of total number of packets without having to process each individual packets in the bundle.

The packet descriptors 320, 330, . . . , 340 are associated with individual packets in a packet bundle. They may include such information as packet identification (ID) 420, packet status 425, packet length 430, packet buffer address 435, or out-of-order indicator 440. For example, the packet ID 420 identifies a packet in a packet bundle using a sequence number identifying the position of the packet in the bundle.

Figure 5:
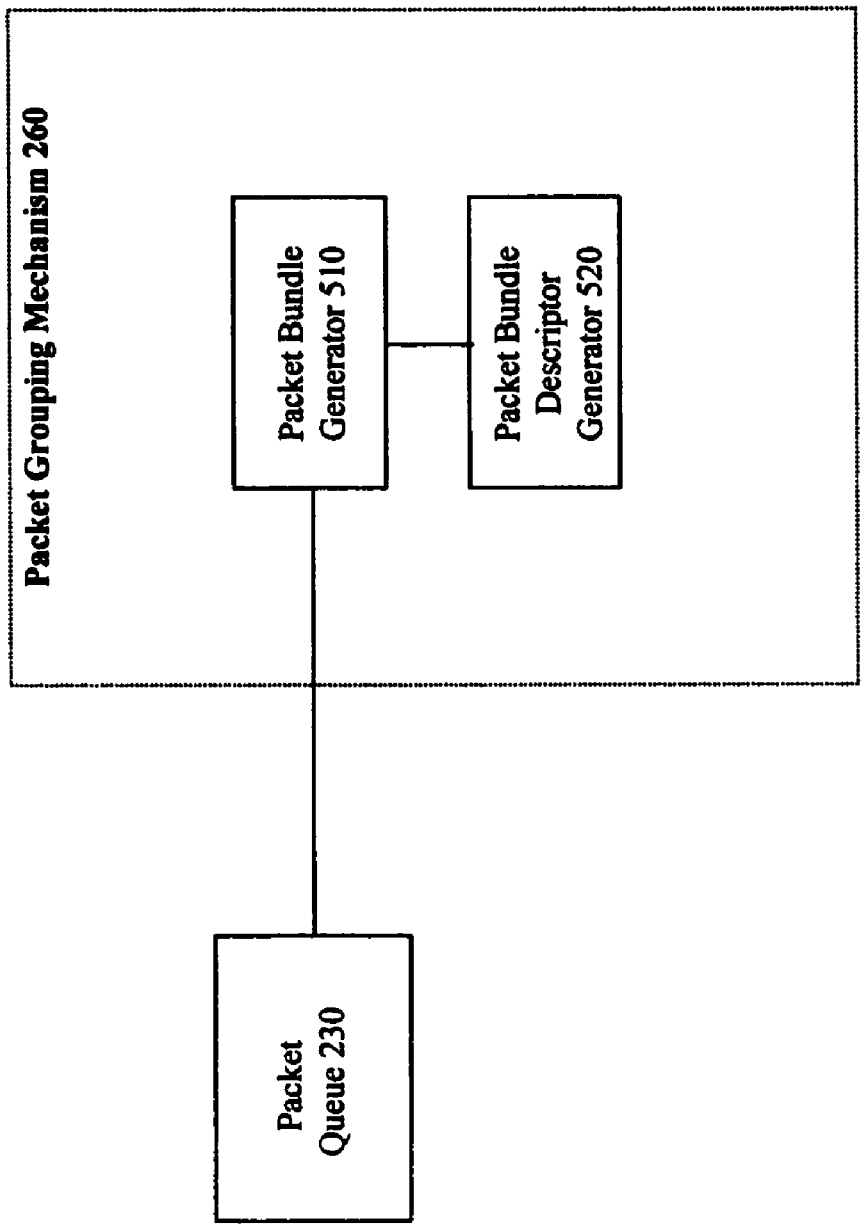
FIG. 5 depicts the internal structure of a packet grouping mechanism, according to an embodiment of the present invention.

To generate a packet bundle and its corresponding packet bundle descriptor, the packet grouping mechanism 260 may invoke different mechanisms. FIG. 5 illustrated an exemplary internal structure of the packet grouping mechanism 260. It includes a packet bundle generator 510 and a packet bundle descriptor generator 520. The former is responsible for creating a packet bundle based on classified packets and the latter is responsible for constructing the corresponding packet bundle descriptor.

The transfer scheduler 250 delivers a packet bundle to the host 140 with proper description at an appropriate time. The delivery may be achieved by notifying the host 140 that a packet bundle is ready to be processed if the packet queue 220 is implemented in the host's memory. Alternatively, the transfer scheduler 250 sends the packet bundle to the host 140. Whenever a packet bundle is delivered, the transfer scheduler 250 sends the corresponding packet bundle descriptor 300 to the host 140.

The host 140 comprises a notification handler 270, a packet bundle processing mechanism 280, and a session update mechanism 290. The notification handler 270 receives and processes a notification from the I/O controller 110. Based on the notification, the packet bundle processing mechanism 280 further processes the received packet bundle. Since all the packets within a packet bundle are similar, the packet bundle processing mechanism 280 treats the bundle as a whole. Furthermore, the session update mechanism 290 utilizes the received packet bundle by its entirety to update an existing session.

Figure 6:
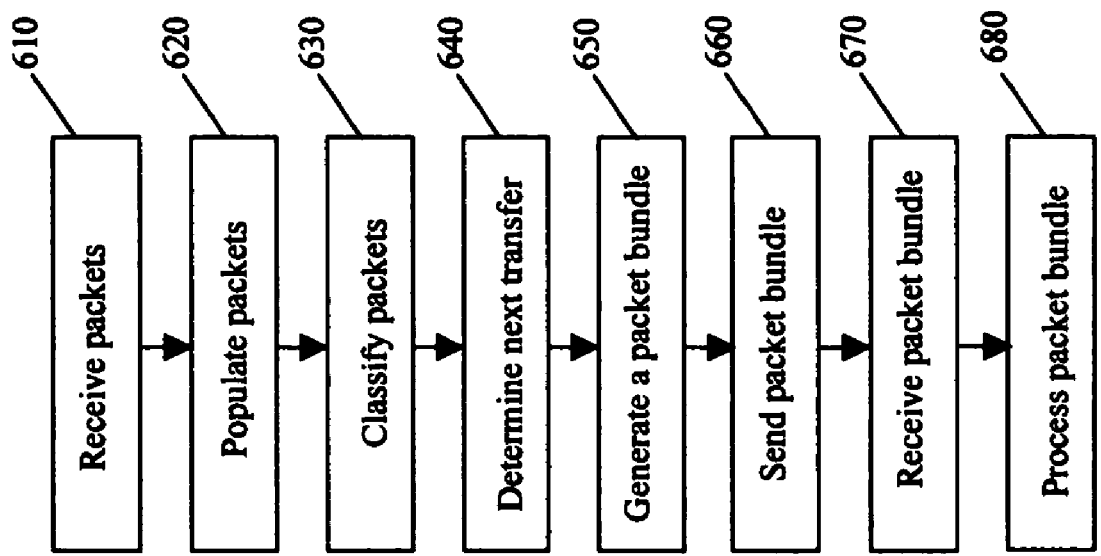
FIG. 6 is an exemplary flowchart of a process, in which a packet bundle is generated based on packet classification and transferred from an I/O controller to a host for processing, according to embodiments of the present invention.

FIG. 6 is an exemplary flowchart of a process, in which a packet bundle is generated based on packet classification and transferred from the I/O controller 110 to the host 140, according to embodiments of the present invention. Packets are received first at 610. Such received packets are populated or buffered at 620 in the packet queue 220. The buffered packets are subsequently classified at 630. The transfer scheduler 250 then determines, at 640, which classified group of packets is to be transferred next.

According to a transfer schedule, a packet bundle and its corresponding packet bundle descriptor are generated, at 650, based on classified packets and then sent, at 660, to the host 140. Upon receiving, at 670, the packet bundle and the corresponding packet bundle descriptor, the host 140 processes, at 680, the packet bundle according to the information contained in the corresponding packet bundle descriptor.

FIG. 7 is an exemplary flowchart of the I/O controller 110, according to an embodiment of the present invention. Packets are received first at 710 and populated, at 720, in the packet queue 220. To classify buffered packets, a session number is identified, at 730, as a dynamic classification criterion. Based the classification criterion, the packet classification mechanism 240 classifies the buffered packets at 740. The transfer scheduler 250 then schedules, at 750, to transfer a packet bundle according to some pre-defined criterion. When a transfer decision is made, the packet grouping mechanism 260 generates, at 760 and 770, a packet bundle based on classified packets and a corresponding packet bundle descriptor. Such generated packet bundle and its descriptor are then transferred, at 780, to the host 140.

FIG. 8 is an exemplary flowchart of the host 140, according to an embodiment of the present invention. Upon receiving a packet bundle and its corresponding packet bundle descriptor at 810, the host 140 parses, at 820, the packet bundle descriptor to extract useful information. To update an appropriate session using the packets in the received packet bundle, the host 140 identifies, at 830, the session number of the packet bundle. Based on the session number, the host 140 updates an existing session using the received packet bundle.

While the invention has been described with reference to the certain illustrated embodiments, the words that have been used herein are words of description, rather than words of limitation. Changes may be made, within the purview of the appended claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

What is claimed is:

1. A host system, comprising:
a notification handler for processing a notification for an arrival of a packet bundle and its corresponding packet bundle descriptor wherein the packet bundle is generated using packets that are classified with respect to a classification criterion after the packets have been inserted in a packet queue; and
a packet bundle processing mechanism for receiving the packet bundle and its corresponding packet bundle descriptor in one transmission, processing the corresponding packet bundle descriptor by extracting information from the packet bundle descriptor, and processing the packet bundle,
wherein the packet bundle descriptor includes an overall bundle descriptor and a plurality of packet descriptors, the overall bundle descriptor including a number of packets in the packet bundle.

2. The host system according to claim 1, further including:
a session updating mechanism for updating an existing session using a session number extracted from the packet bundle descriptor, wherein the host computer updates the existing session with a correct number of total packets without having to process each individual packet in the packet bundle.

3. The host system according to claim 1, wherein the notification for the arriving of a packet bundle is sent from an I/O controller.

4. The host system according to claim 3, wherein the I/O controller is physically separate from the host system.

5. The host system according to claim 2, wherein the packet bundle processing mechanism extracts a session number from the packet bundle.

6. The host system according to claim 1, wherein the packet bundle descriptor specifies a length of each packet.

7. A computer-implemented method for a host computer, the computer-implemented method causing the host computer to:
receive a packet bundle and a packet bundle descriptor in one transmission wherein the packet bundle is generated using packets that are classified with respect to a classification criterion after the packets have been inserted in a packet queue; and
process the packet bundle descriptor by extracting information from the packet bundle descriptor and processing the packet bundle,
wherein the packet bundle descriptor includes an overall bundle descriptor and a plurality of packet descriptors, the overall bundle descriptor including a number of packets in the packet bundle.

8. The computer-implemented method of claim 7, the computer-implemented method further causing the host computer to update an existing session on the host computer using a session number extracted from the packet bundle descriptor, wherein the host computer updates the existing session with a correct number of total packets without having to process each individual packet in the packet bundle.

9. The computer-implemented method of claim 7, wherein the packet bundle descriptor includes a length of each packet in the packet bundle.

10. A program code storage device, comprising:
a non-transitory computer readable storage medium,
computer readable program code, stored on the non-transitory computer readable storage medium, including instructions, which when executed cause a host computer to:
receive a packet bundle and its corresponding packet bundle descriptor in one transmission, wherein the packet bundle is generated using packets that are classified with respect to a classification criterion after the packets have been inserted in a packet queue;
process the corresponding packet bundle descriptor by extracting information from the packet bundle descriptor; and; and wherein the packet bundle descriptor includes an overall bundle descriptor and a plurality of packet descriptors, the overall bundle descriptor including a number of packets in the packet bundle.

11. The program code storage device of claim 10, further including instructions, which when executed, cause the host computer to update an existing session on the host computer using a session number extracted from the packet bundle descriptor, wherein the host computer updates the existing session with a correct number of total packets without having to process each individual packet in the packet bundle.

12. The program code storage device of claim 10, wherein the packet bundle descriptor includes a length of each packet in the packet bundle.

* * * * *

UNITED STATES PATENT AND TRADEMARK OFFICE
CERTIFICATE OF CORRECTION

| | | |
|---|---|---|
| PATENT NO. | : 7,936,755 B2 | |
| APPLICATION NO. | : 11/141917 | |
| DATED | : May 3, 2011 | |
| INVENTOR(S) | : Mann et al. | |

It is certified that error appears in the above-identified patent and that said Letters Patent is hereby corrected as shown below:

On title page, item 75 Inventors
      replace "Diamant Nimrod"
      with --Nimrod Diamant--.

Signed and Sealed this

Thirteenth Day of September, 2011

David J. Kappos
*Director of the United States Patent and Trademark Office*